Patented Feb. 10, 1953

2,628,224

UNITED STATES PATENT OFFICE 2,628,224

VINYL DIALKYLAMINOHYDROCARBON-AMIDES

Theodore Le Sueur Cairns, Newark, and John C. Sauer, Wilmington, Del., assignors to E. I. du Pont de Nemours & Company, Wilmington, Del., a corporation of Delaware No Drawing. Application January 16, 1951, Serial No. 206,320

22 Claims. (Cl. 260—89.7)

This invention relates to N-vinyl substituted amides and to methods for preparing them. More particularly this invention relates to new N-vinyl substituted amides containing tertiary amino groups, to methods for their preparation, and to polymers and copolymers of the N-vinyl substituted amides.

It is an object of this invention to provide new N-vinyl substituted amides. A further object of this invention is to provide methods for the preparation of N-vinyl substituted amides having a tertiary amino group. An important object is to provide new polymers and copolymers of N-vinyl substituted amides. Other objects will appear hereinafter.

These objects are accomplished by the invention of the new chemical compounds, the N-vinyl substituted amides having a tertiary amino group linked to the amido nitrogen atom through a bivalent carbon chain, preferably a bivalent hydrocarbon radical, of 2 to 12 carbon atoms, and methods for their preparation. This invention also provides polymers of these new N-vinyl substituted amides and copolymers thereof with other polymerizable organic compounds.

The new N-vinyl substituted amides of this invention are prepared by the reaction, in the presence of a basic catalyst, of acetylene with an amide having the amido nitrogen attached to hydrogen and to a radical containing tertiary amino nitrogen, the tertiary amino nitrogen being separated from the amido nitrogen by a bivalent carbon chain, preferably a bivalent hydrocarbon radical, of 2 to 12 carbon atoms.

In practicing one embodiment of this invention for preparing the novel N-vinyl substituted amides, a pressure reactor is charged with the amide, basic catalyst, and an inert reaction medium. The charge is cooled to 0° C. or lower and the system deoxygenated either by sweeping it with oxygen-free nitrogen or by evacuation. Acetylene is then injected into the system to a pre-determined pressure and the charge heated with agitation. The pressure within the system is maintained by periodic re-pressuring with acetylene. After reaction is complete, as evidenced by cessation of pressure drop, the reaction mixture is permitted to cool to room temperature, the pressure let down, the reactor opened, and the contents discharged. The desired product is isolated from the reaction mixture by distillation or other means known to those skilled in the art.

The N-vinyl substituted amides of this invention may be polymerized with the aid of free-radical generating catalysts either by the bulk, solution, or emulsion polymerization techniques.

The examples which follow are submitted to illustrate and not to limit this invention. Parts are by weight, unless otherwise stated.

Example 1

Into a pressure vessel which has been swept with deoxygenated nitrogen there is charged 65 parts of N-(3-dimethylaminopropyl)acetamide, prepared as described subsequently, 2 parts of potassium and 78 parts of anhydrous, thiophene-free benzene. The vessel is closed, cooled in a dry ice/methanol bath, evacuated, and acetylene pressured to a total pressure of about 100 lbs./sq. in. The contents of the vessel are heated with agitation to 120° to 136° C. during a period of 7 hours, while acetylene is injected to maintain a pressure of 150–190 lbs./sq. in. At the end of the reaction the vessel is cooled to room temperature, excess pressure is vented, and the contents discharged. The reaction mixture is distilled in vacuo. After removing the benzene, the following fractions are obtained.

| Cut | Boiling Point, °C./mm. Hg | Product, Parts by Weight | $n_D^{25}$ |
|---|---|---|---|
| 1 | 82–95/5 | 1.5 | 1.4751 |
| 2 | 93–101/5 | 3.1 | 1.4751 |
| 3 | 101–105/5 | 7.0 | |
| 4 | 119–128/2–5 | 39.6 | |

The elemental analysis of cut 3 is as follows:

Calc'd. for the N-vinyl amide, $C_9H_{18}N_2O$ — N, 16.5
Found — N, 16.67
16.76

The N-vinyl product of two additional runs analogous to that described above are composited with cut 3 and the composite fractionated in a still of high efficiency.

| Cut | Boiling Point, °C./mm. | Product, Parts by Weight | $n_D^{25}$ |
|---|---|---|---|
| 1 | 82–95/5 | 6 | 1.4796 |
| 2 | 95–95.5/5 | 19 | 1.4798 |
| 3 | 95–95.5/5 | 10 | 1.4800 |
| 4 | 95–96.5/5 | 7 | 1.4800 |
| 5 | 96.5–97 | 10 | 1.4793 |

Cuts 2–5 are the desired N-vinyl amide, that is N-vinyl-N-(3-dimethylaminopropyl)acetamide, and the elemental analysis on the heart cut (cut 3) is as follows:

Calc'd. for $C_9H_{18}ON_2$ — C, 63.6; H, 10.6; N, 16.5
Found — C, 63.76; H, 10.86; N, 16.12
63.66  10.84

Five parts of the N-vinyl substituted amide is mixed with 0.02 part of 1,1'-azodicyclohexanecarbonitrile and the mixture heated at 100° C. for 5 hours. Polymerization takes place to give an extremely viscous, nearly water-white material.

Anal. of polymer:
Calc'd. for C₉H₁₈ON₂ _____ N, 16.5
Found _____ N, 16.36
16.26

A copolymer of the N-vinyl substituted amide with vinyl acetate is prepared as follows:

Seventy-seven and four tenths parts of vinyl acetate, 8.6 parts of N-vinyl-N-(3-dimethylaminopropyl)acetamide, and 1.7 parts of azobisisobutyronitrile are dissolved in 86 parts of tertiary butyl alcohol, and the mixture heated under reflux for 4 hours in a flask equipped with a reflux condenser. The viscous polymer solution is stripped with steam and the resulting coagulum dried on a rubber mill at 100° to 110° C. The white, opaque, brittle product weighs 70 parts and is soluble in acetone, chloroform, and dilute acetic acid. Analysis of the product shows it to contain 1.94 and 1.87% nitrogen, which corresponds to a product containing 11.6% of the basic N-vinyl amide monomer. Films cast on glass from dilute acetic acid solutions and dried at 50° C. for one hour are clear and hard.

The N-(3-dimethylaminopropyl)acetamide, used in the preparation of the N-vinyl-N-(3-dimethylaminopropyl)acetamide is prepared as follows:

Two hundred fifty-five parts of N,N-dimethyltrimethylenediamine (B. P. 40°/18 mm.) and 500 parts of ethyl acetate are charged into a pressure vessel, the vessel is closed and heated to 150° C. for 8 hours. After discharging the contents of the bomb, there is obtained, by fractional distillation, 261.7 parts of the N-acetyl derivative, that is N-(3-dimethylaminopropyl)acetamide, distilling at 154° to 158°/19-23 mm., $n_D^{25}$ 1.4579.

Example II

A pressure vessel is charged as described in Example I with 62 parts of N-(2-dimethylaminoethyl)benzamide, 2 parts of potassium, and 78 parts of anhydrous, thiophene-free benzene. The vessel is closed, cooled in a dry ice/methanol bath and acetylene pressured to a total pressure of about 100 lbs./sq. in. The contents of the vessel are heated with agitation to 130° C. for a period of 6.2 hours, while acetylene is injected to maintain a pressure of 200 to 225 lb./sq. in. Thereafter the vessel is cooled to room temperature, excess pressure vented and the contents discharged. This run is composited with a duplicate run made from 22 parts of the amide, 1 part of potassium and 78 parts benzene. After removing benzene, the following fractions are obtained.

| Cut | Boiling Point, °C./mm. | Product, Parts by Weight |
|---|---|---|
| 1 | 87-95/5 | 0.5 |
| 2 | 133-138/5 | 2.4 |
| 3 | 146-148/5 | (¹) |

¹ Starting material.

The elemental analysis of cut 2 is as follows:

Calc'd. for the N-vinyl amide, that is N-vinyl-N-(2-dimethylaminoethyl)benzamide, C₁₃H₁₈N₂O _____ N, 12.8
Found _____ N, 13.29

This amide can be polymerized under the conditions described in Example I.

The N-(2-dimethylaminoethyl)benzamide is prepared by refluxing 64 parts of N-dimethylaminoethylamine with 220 parts of ethyl benzoate for 6 hours and distilling the reaction mixture in vacuo. There is obtained 63 parts of the benzamide distilling at 135° to 143°/0.7-1.2 mm., $n_D^{25}$ 1.5407.

Anal. of the amide:
Calc'd. for C₁₁H₁₆N₂O _____ N, 14.5
Found _____ N, 14.35

Example III

By the procedure outlined in the preceding examples a mixture of 72 parts of N-(4-diethylaminophenyl)propionamide, 2 parts of potassium, and 78 parts of benzene is reacted with acetylene at 130° to 140° C. during 4.2 hours at a pressure of 230-260 lb./sq. in. The reaction mixture is distilled in vacuo. After removing the benzene, the following fractions are obtained.

| Cut | Boiling Point, °C./mm. | Product, Parts by Weight | $n_D^{25}$ |
|---|---|---|---|
| 1 | 93.2-142/0.4-0.5 | 11.7 | |
| 2 | 142-145/0.5 | 2.9 | 1.5612 |
| 3 | 175/0.5 | 47.0 | |

Cut 2 is essentially pure N-vinylamide, that is N-vinyl-N-(4-diethylaminophenyl)propionamide. The elemental analysis of this cut is as follows:

Calc'd. for N-vinylamide, C₁₅H₂₂N₂O ____ N, 11.4
Found _____ N, 11.8

This amide can be polymerized under the conditions set forth in Example I.

The N-(diethylaminophenyl)propionamide is prepared from diethylaminoaniline hydrochloride as follows: 150 parts of diethylaminoaniline hydrochloride and 158 parts of sodium carbonate are slurried in 300 parts of water, while 70 parts of propionyl chloride are added dropwise. An oily layer settles on top, after stirring is discontinued. The oily layer is taken up in ether, separated from the water layer and evacuated at room temperature and 100 mm. vacuum. Nearly all of the residual viscous dark liquid distilled at 181°/1.2 mm. (108 parts). After recrystallization from 70% aqueous alcohol, there is obtained 83 parts of the substituted propionamide, M. P. 73°.

Calculated for C₁₃H₂₀N₂O _____ N, 12.8
Found _____ N, 13.1

The products of this invention can be made at temperatures of from 80° to 250° C. Because good yields of desired products are obtained, at practical reaction rates, in the more restricted range of 100° to 200° C., this embraces the preferred operating temperature conditions.

The vinylation may be effected at pressures ranging from atmospheric up to the limit of the equipment used. For practical reasons, pressures which are in the range of 5 to 30 atmospheres are usually employed.

The presence of a basic catalyst is critical to obtain the products of this invention. Suitable catalysts are the alkali metals such as sodium, potassium or lithium, their alkoxides, hydrides, oxides, and alkyls, e. g., sodium ethoxide, potassium isopropoxide, lithium hydride, potassium hydride, potassium oxide, sodium oxide, lithium butyl, potassium ethyl, etc. The amount of catalyst may vary from 0.5 to 10% by weight of the amide being vinylated. However, because good yields of desired products, at practical reaction rates, are obtained employing from 1.5 to 4% of catalyst, that constitutes the amount most generally used.

For practical reasons the vinylation is effected in solution in an inert solvent such as benzene, toluene, cyclohexane, ethyl ether, tetrahydrofuran, dioxan, and the like.

The amides which are vinylated in accord with this invention are those whose amido nitrogen atom has attached thereto hydrogen and a radical containing tertiary amino nitrogen, which amido nitrogen is separated from the amido nitrogen atom by a bivalent carbon chain of 2 to 12 carbon atoms. The preferred N-substituted amides correspond to the general formula:

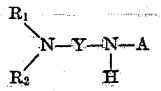

wherein $R_1$ and $R_2$ are monovalent hydrocarbon radicals of 1 to 18 carbon atoms, especially alkyl radicals of 1 to 7 carbon atoms, Y is a bivalent hydrocarbon radical of 2 to 12 carbon atoms, such as an alkylene, arylene, or cyclohexylene radical, and A is a sulfonyl radical or the acyl radical of a monocarboxylic acid containing up to 20 carbon atoms preferably an alkanoyl radical or the benzoyl radical. Specific examples of such amides are N-(3-ethylmethylaminobutyl) propionamide, N-(7-cyclohexyldodecylaminoheptyl) lauramide, N-(3-propyl-4-dimethylaminobutyl) stearamide, N-(3-diamylaminohexyl) myristamide, N-(8-amylethylaminooctyl) valeramide, N-(2-dimethylaminoethyl) benzenesulfonamide, N-(3-ethylmethylaminopropyl) toluenesulfonamide, N-(5-ethylisopropylaminopentyl)-2,4-xylenesulfonamide, N-(4-dimethylaminophenyl) benzamide, N-(4-diethylaminocyclohexyl) acetamide, and the like.

The preferred N-vinyl amides correspond to the general formula

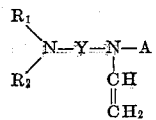

wherein $R_1$ and $R_2$, Y and A are defined as aforesaid.

In the right column of the table below are given the N-vinyl substituted amides which are obtained by substituting the amides appearing in the left column of the table for the specific amide of Example I in the process of Example I.

| Amide Vinylated | N-Vinyl Substituted Amide Obtained |
|---|---|
| N-(3-ethylmethylaminobutyl) propionamide. | N-vinyl-N-(3-ethylmethylaminobutyl) propionamide. |
| N-(7-cyclohexyldodecylaminoheptyl) lauramide. | N-vinyl-N-(7-cyclohexyldodecylaminoheptyl) lauramide. |
| N-(3-propyl-4-dimethylaminobutyl) stearamide. | N-vinyl-N-(3-propyl-4-dimethylaminobutyl) stearamide. |
| N-(3-diamylaminohexyl) myristamide. | N-vinyl-N-(3-diamylaminohexyl)-myristamide. |
| N-(8-amylethylaminooctyl) valeramide. | N-vinyl-N-(8-amylethylaminooctyl) valeramide. |
| N-(2-dimethylaminoethyl) benzene-sulfonamide. | N-vinyl-N-(2-dimethylaminoethyl) benzenesulfonamide. |
| N-(3-ethylmethylaminopropyl)-toluenesulfonamide. | N-vinyl-N-(3-ethylmethylamino-propyl) toluenesulfonamide. |
| N-(5-ethylisopropylaminopentyl)-2,4-xylenesulfonamide. | N-vinyl-N-(5-ethylisopropylamino-pentyl)-2, 4-xylenesulfonamide. |
| N-(4-dimethylaminophenyl)benzamide. | N-vinyl-N-(4-dimethylaminophenyl) benzamide. |
| N-(4-diethylaminocyclohexyl) acetamide. | N-vinyl-N-(4-diethylaminocyclohexyl) acetamide. |
| N-ethyl-4-dimethylaminobenzamide. | N-vinyl-N-ethyl-4-dimethylamino-benzamide. |
| N-methyl-4-dimethylamino-valeramide. | N-vinyl-N-methyl-4-dimethyl-aminovaleramide. |

The products of this invention by virtue of having a vinyl group are susceptible of polymerization alone and with other polymerizable ethylenically unsaturated organic compounds, as has already been illustrated. The composition of the polymers may be varied over wide limits. Generally, however, the amount of N-vinyl amide is maintained in the range of 5 to 95% by weight for best results. A class of these polymerizable ethylenically unsaturated compounds are the aliphatic olefins, such as ethylene, propylene, the butylenes, butadiene, isoprene, etc., vinyl and vinylidene compounds, such as halogenated ethylenes, e. g., vinyl fluoride, vinylidene fluoride, trifluoroethylene, tetrafluoroethylene, vinyl chloride, vinylidene chloride, vinyl propionate, vinyl trimethyl acetate, vinyl camphorate, etc., vinyl methyl ketone, vinyl propyl ketone, acrylo- and methacrylonitriles, acrylic and methacrylic acid amides and esters, etc., diallyl compounds, e. g., diallyl phthalate, diallyl succinate, etc., butenedioic acid esters, such as maleic and fumaric acid esters, maleic anhydride, maleonitrile and fumaronitrile, etc. Combinations of one or more of the above polymerizable organic compounds may be used, if desired. Polymerizable organic compounds containing a terminal methylene group are preferred because of the ease with which they polymerize with the N-vinyl substituted amides of this invention.

As catalysts for the polymerization there can be used any material which yields unstable free radicals under the conditions of reaction. Examples of such are the azo compounds of the kind disclosed in U. S. Patent 2,471,951, such as alpha,alpha'-azobis(alpha,gamma-dimethylvaleronitrile), dimethyl and diethyl alpha,alpha'-azodiisobutyrate, 1,1'-azodicyclohexanecarbonitrile, etc., peroxy compounds, such as organic peroxides, e. g., benzoyl peroxide, diethyl peroxide, di(tertiary butyl) peroxide, tertiary butyl hydroperoxide, etc., azines, such as benzalazine, diphenyl ketazine, etc., oximes, such as acetoneoxime, camphoroxime, etc., amine oxides, e. g., trimethylamine oxide, etc., and persulfates such as ammonium persulfate.

The concentration of catalyst may vary over a wide range. For reasons of economy and in order to obtain products of relatively high molecular weight, it is desirable to use as low a concentration of catalyst as possible, for example, from about 0.01 to about 1%, based on the combined weights of the monomers being polymerized. If lower molecular weight products are desired, larger amounts of catalyst may be used, for example, about 15% or more.

The polymerization may be effected at temperatures varying from room temperature up to 150° C. or more, depending upon the nature of the monomer or monomers being polymerized with the N-vinyl substituted amides and the nature and amount of catalyst employed.

The polymerization may be carried out by the bulk, solution, or emulsion technique.

The products of this invention, by virtue of containing a tertiary amino nitrogen, may be converted into quaternary compounds of interest as insecticides, fungicides, bactericides, etc. They are also useful as copolymer components to improve dye receptivity and add acid solubility to resins which are otherwise deficient in these properties. They are also useful as anti-halation agents for photographic film, etc.

The homopolymers are useful as anti-static agents, as anti-snag agents for hosiery, and cationic emulsifying agents.

As many apparently widely different embodiments of this invention may be made without departing from the spirit and scope thereof, it is to be understood that this invention is not limited to the specific embodiments thereof except as defined in the appended claims.

We claim:

1. An N-monovinyl substituted amide containing a tertiary amino nitrogen atom, two of whose valences are satisfied by alkyl radicals of 1 to 18 carbon atoms and the third valence being satisfied by a bivalent hydrocarbon radical of 2 to 12 carbon atoms selected from the class consisting of alkylene, arylene and cyclohexylene radicals, said hydrocarbon radical being linked directly by a single bond to a member of the class consisting of carbonamide and sulfonamido groups containing a vinyl group attached directly to the amido nitrogen atom.

2. A polymer of an N-monovinyl substituted amide as set forth in claim 1.

3. An N-monovinyl substituted amide containing a tertiary amino nitrogen atom linked through a carbon chain of 2 to 12 carbon atoms to the amido nitrogen atom and having the general formula

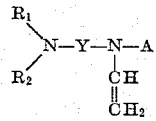

wherein $R_1$ and $R_2$ are alkyl radicals of 1 to 7 carbon atoms, Y is an alkylene radical of 2 to 12 carbon atoms separating the amino and amido nitrogen atoms, and A is an alkanoyl radical of not more than 20 carbon atoms.

4. A polymer of an N-monovinyl substituted amide as set forth in claim 3.

5. An N-monovinyl substituted amide containing a tertiary amino nitrogen atom linked through a carbon chain of 2 to 12 carbon atoms to the amido nitrogen atom and having the general formula.

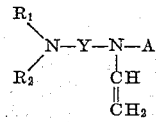

wherein $R_1$ and $R_2$ are alkyl radicals of 1 to 7 carbon atoms, Y is an alkylene radical of 2 to 12 carbon atoms separating the amino and amido nitrogen atoms, and A is the benzoyl radical.

6. A polymer of an N-monovinyl substituted amide as set forth in claim 5.

7. An N-monovinyl substituted amide containing a tertiary amino nitrogen atom linked through a carbon chain of 2 to 12 carbon atoms to the amido nitrogen atom and having the general formula

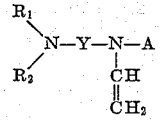

wherein $R_1$ and $R_2$ are alkyl radicals of 1 to 7 carbon atoms, Y is an arylene radical of not more than 12 carbon atoms separating the amino and amido nitrogen atoms, and A is an alkanoyl radical of not more than 20 carbon atoms.

8. A polymer of an N-monovinyl substituted amide as set forth in claim 7.

9. An N-monovinyl substituted amide containing a tertiary amino nitrogen atom linked through a carbon chain of 2 to 12 carbon atoms to the amido nitrogen atom and having the general formula

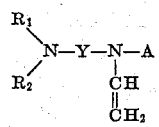

wherein $R_1$ and $R_2$ are alkyl radicals of 1 to 7 carbon atoms, Y is an arylene radical of not more than 12 carbon atoms separating the amino and amido nitrogen atoms, and A is the benzoyl radical.

10. A polymer of an N-monovinyl substituted amide as set forth in claim 9.

11. An N-monovinyl substituted amide containing tertiary amino nitrogen atom linked through a carbon chain of 2 to 12 carbon atoms to the amido nitrogen atom and having the general formula

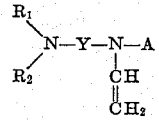

wherein $R_1$ and $R_2$ are alkyl radicals of 1 to 7 carbon atoms, Y is the cyclohexylene radical separating the amino and amido nitrogen atoms, and A is an acyl radical of a monocarboxylic acid of not more than 20 carbon atoms.

12. A polymer of an N-monovinyl substituted amide as set forth in claim 11.

13. An N-monovinyl substituted amide containing a tertiary amino nitrogen atom linked through a carbon chain of 2 to 12 carbon atoms to the amido nitrogen atom and having the general formula

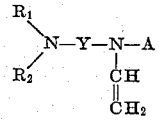

wherein $R_1$ and $R_2$ are alkyl radicals of 1 to 7 carbon atoms, Y is an alkylene radical of 2 to 12 carbon atoms separating the amino and amido nitrogen atoms, and A is an acyl radical of a monocarboxylic acid of not more than 20 carbon atoms.

14. A polymer of an N-monovinyl substituted amide as set forth in claim 13.

15. An N-monovinyl substituted amide containing a tertiary amino nitrogen atom linked through a carbon chain of 2 to 12 carbon atoms to the amido nitrogen atom and having the general formula

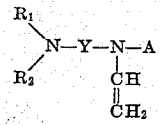

wherein $R_1$ and $R_2$ are alkyl radicals of 1 to 7 carbon atoms, Y is an arylene radical of not more than 12 carbon atoms separating the amino and amido nitrogen atoms, and A is an acyl radical of a monocarboxylic acid of not more than 20 carbon atoms.

16. A polymer of an N-monovinyl substituted amide as set forth in claim 15.

17. The chemical compound N-vinyl-N-(3-dimethylaminopropyl) acetamide.

18. A polymer of N-vinyl-N-(3-dimethylaminopropyl)acetamide.

19. The chemical compound N-vinyl-N-(2-dimethylaminoethyl)benzamide.

20. A polymer of N-vinyl-N-(2-dimethylaminoethyl)benzamide.

21. The chemical compound N-vinyl-N-(4-diethylaminophenyl)propionamide.

22. A polymer of N-vinyl-N-(4-diethylaminophenyl)propionamide.

THEODORE LE SUEUR CAIRNS.
JOHN C. SAUER.

REFERENCES CITED

The following references are of record in the file of this patent:

UNITED STATES PATENTS

| Number | Name | Date |
|---|---|---|
| 2,311,548 | Jacobson et al. | Feb. 16, 1943 |
| 2,317,804 | Reppe et al. | Apr. 27, 1943 |
| 2,541,152 | Cairns | Feb. 13, 1951 |